Figure 1:
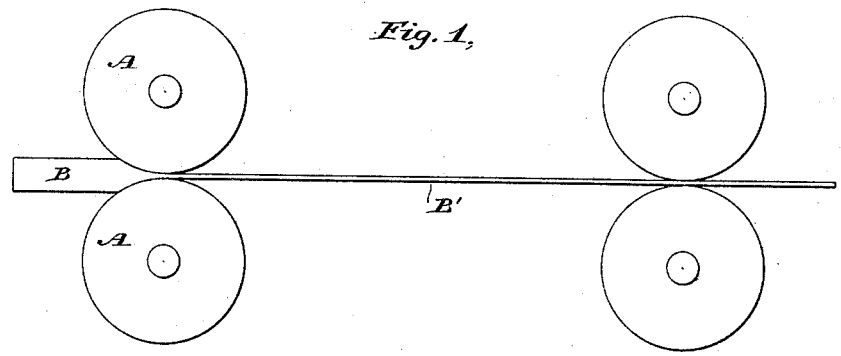

(No Model.) 2 Sheets—Sheet 1.

C. B. HARRIS.
METHOD OF MAKING INCANDESCING ELEMENTS FOR GAS BURNERS.

No. 409,607. Patented Aug. 20, 1889.

Witnesses
Geo. W. Breck.
Henry W. Lloyd.

Inventor
Charles B. Harris
By his Attorneys
Baldwin, Davidson & Wight (No Model.) 2 Sheets—Sheet 2.

C. B. HARRIS.
METHOD OF MAKING INCANDESCING ELEMENTS FOR GAS BURNERS.

No. 409,607. Patented Aug. 20, 1889.

Witnesses
Geo. W. Breck.
Henry W. Lloyd.

Inventor
Charles B. Harris,
By his Attorneys
Baldwin, Davidson & Wight

UNITED STATES PATENT OFFICE.

CHARLES B. HARRIS, OF NEW YORK, N. Y.

METHOD OF MAKING INCANDESCING ELEMENTS FOR GAS-BURNERS.

SPECIFICATION forming part of Letters Patent No. 409,607, dated August 20, 1889.

Application filed April 24, 1889. Serial No. 308,454. (No model.)

*To all whom it may concern:*

Be it known that I, CHARLES B. HARRIS, a citizen of the United States, residing in New York, county of New York, State of New York, have invented an Improved Method of Making Incandescing Elements for Gas-Burners, of which the following is a specification.

My invention relates to that class of gas-burners in which hydrogen or water gas is burned to render incandescent an element or body of material hung in the flame. Usually the incandescing element of such burners has been composed of filaments or fine threads or pencils formed by expressing the compound of which they are composed through suitable dies. As this class of burners is now well known, further reference to the state of the art is unnecessary. The material employed in making such elements may be varied, a large number of refractory substances or earths being suitable for the purpose—such, for instance, as magnesia, zirconia, strontia, &c. In their preparation they are mixed with some vehicle which gives the compound the capacity of being formed into the required shapes. For instance, it is common to employ a mixture of starch and magnesia in making incandescing pencils, and also a mixture of magnesia and glue, either with or without starch, for the same purpose, and also for making threads or filaments which may be wrought into the desired shape. Afterward they are burned to remove the binding material and are then ready for use. In those burners in which pendent pencils are hung in the flame the pencils are each separately formed and are held in a head or holder with a cement preferably of the same material. This is a difficult operation, since the pencils are very delicate and breakage is large. Where the thread or filament is formed through a die, it must be wrought into the shape required and then burned, the method of operation requiring care and considerable time.

My invention comprehends a method of making incandescing elements unlike either of those mentioned; and it consists, generally speaking, in forming the compound into a sheet of the thinness and delicacy required and then cutting out, perforating, or slitting the sheet, so as to obtain the shape or pattern which is desired.

In practicing my invention I preferably mix with the refractory material a portion of glue or like substance, as above suggested, so as to give the compound toughness and flexibility. I then form it into sheets, preferably by passing it between rolls. From the sheet thus formed I may cut blanks, and then cut, slit, perforate, or otherwise form the blank to give the desired pattern, after which the element is burned and is then ready for use.

Figure 2:
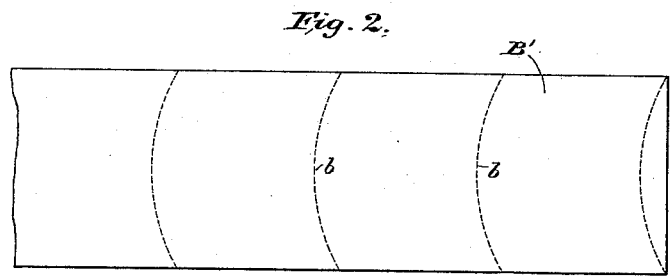
Figure 3:
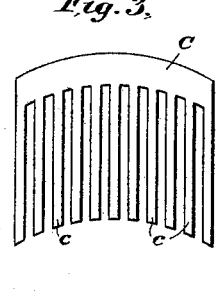
Figure 4:
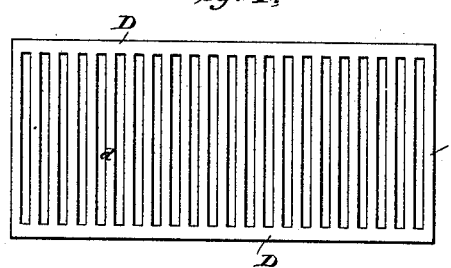
Figure 6:
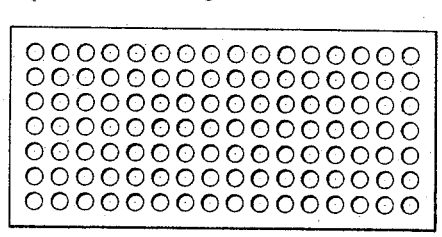
Figure 7:
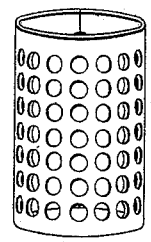
Figure 9:
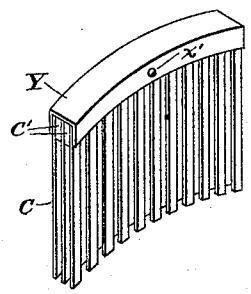
Figure 8:
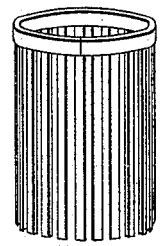
Figure 13:
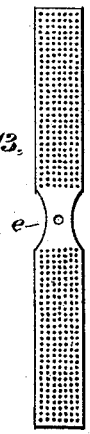
Figure 10:
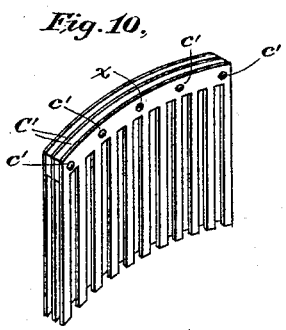
Figure 11:
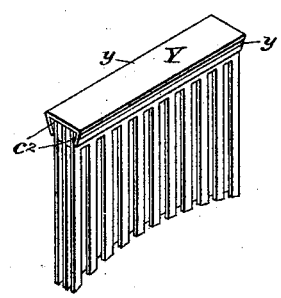
Figure 14:
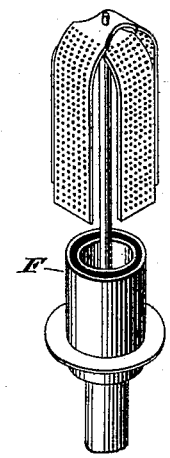
Figure 12:
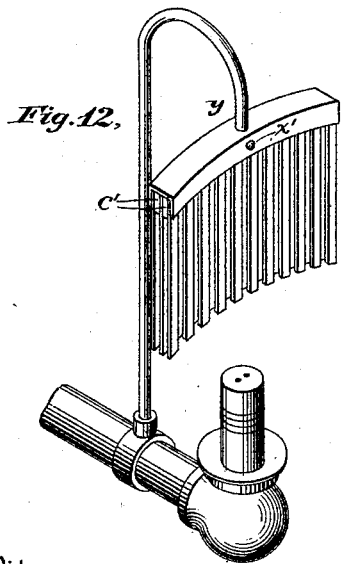
Figure 15:
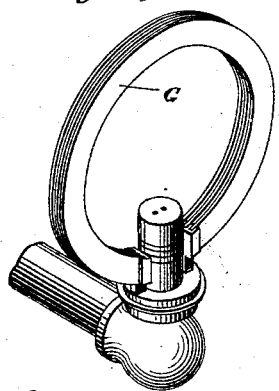

In the accompanying drawings, Figure 1 indicates rolls with a sheet of material passing between them. Fig. 2 shows a sheet of the compound, the dotted lines indicating the shape of the blanks which may be cut from it. Figs. 3 and 4 show blanks that have been punched, cut, or slit to form the incandescing element; and Fig. 5 indicates the blank shown in Fig. 4 bent into circular form. Figs. 6 and 7 are like views of another pattern; Fig. 8, a view of a circular incandescing element somewhat like that shown in Fig. 5. Fig. 9 illustrates a head or holder with three elements such as shown in Fig. 3 hung in it. Fig. 10 shows an assemblage of three elements and interposed washers ready to be inserted in the head shown in Fig. 9; Fig. 11, a view of another head with three elements secured therein. Fig. 12 represents an ordinary gas bracket and burner with a head like that shown in Fig. 9 suspended above the burner. Fig. 13 shows a different form of element. Fig. 14 indicates a pair of such elements hung above a circular burner. Fig. 15 shows three curved or loop-shaped elements mounted upon a gas-burner.

A A are pairs of rolls for rolling the compound B into sheets.

B', Fig. 2, represents a thin sheet of the material. If an element—such as that shown in Figs. 9, 10, 11, and 12—is to be made, the sheet may be cut into blanks, as indicated by the dotted lines $b$, and these blanks be cut or punched, as shown in Fig. 3—that is, with a solid portion or web C at one end and thin strips or ribbons $c$ extending therefrom. If a circular burner is to be used, the sheet of material may be cut with parallel slots, so as to leave solid top and bottom edges D D, connected by thin strips $d$, Fig. 4, and such a blank may be bent into circular form, as in Fig. 5; or the sheet may be perforated with a large number of circular or other shaped holes and then bent up in the same manner as in Figs. 6 and 7.

Figure 5:
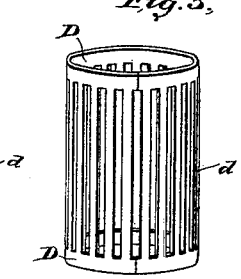

As represented in Fig. 8, a circular element may be formed, having an upper edge D, with pendent ribbons or strips $d$, the element being like that shown in Fig. 5, except that there is no lower solid edge; or, as shown in Figs. 13 and 14, I may form the element of a relatively long and narrow strip or ribbon E, preferably narrower at the middle $e$, and punched out or perforated, as shown. Such an element may be bent in the middle and suspended at that point, so as to hang down on each side of the support, and a number of them may be arranged upon the same support or pin that may pass through an aperture in the middle of the element, as seen in Fig. 14, where two elements are arranged above a circular burner F, which is merely indicated and may be of any desired construction; or, as shown in Fig. 15, loop-shaped or bow-shaped elements G may be cut from the sheet of material and supported vertically upon a gas-burner in any suitable manner, as indicated, three such elements arranged in parallel planes being shown in the figure.

Figs. 9, 10, 11, and 12 show burners having elements similar to those shown in Fig. 3. In Fig. 10 three such elements are arranged, together with spacing-pieces C', of the same material, arranged between the parts C. The parts C and the spacing-pieces C' may be fastened together by pins $c'$, passing through apertures therein. At about the middle of this assemblage of elements a hole $x$ may be left, so that when the assemblage of elements is slipped into the head or holder Y, Figs. 9 and 12, a pin $x'$ may be passed through to retain it in place.

In Fig. 11 a straight holder Y is shown, having inwardly-bent sides $y$. Of course the upper edge of the parts C and C' should be straight and may be given a dovetail form by side pieces $c^2$. The assemblage of elements may therefore be slipped into the head and will be retained in place by the dovetail joint.

In the drawings I have shown all the parts as thicker and heavier than they need be in practice; and of course I have shown only a few of the many designs into which the sheet of material may be formed. After the material has been cut or stamped into the desired shape or design for the incandescent element it is burned, as is usual, and is then ready for use.

By my improved method of operation I may readily make any required form of incandescing elements, and am enabled to produce them economically and rapidly.

I claim as my invention—

The method of making incandescing elements for gas-burners, which consists in preparing a compound of the refractory earth or material and some vehicle—such, for instance, as glue—then rolling it into a thin sheet, then cutting or punching from the sheet an element of the desired design, and then burning the element to burn out the material mixed with the refractory earth or material, substantially as set forth.

In testimony whereof I have hereunto subscribed my name.

CHARLES B. HARRIS.

Witnesses:
AUGUSTUS MERRITT,
M. J. KELLEY.